United States Patent [19]

Nakamura et al.

[11] Patent Number: 4,825,373
[45] Date of Patent: Apr. 25, 1989

[54] FUEL INJECTION TIMING CONTROL APPARATUS FOR A DIESEL ENGINE, INCLUDING A DETERMINATION OF WHEN ACTUAL IGNITION CAN BE DETECTED

[75] Inventors: Tetsuya Nakamura, Kariya; Nobuhito Hobo, Inuyama; Akira Masuda, Aichi; Kazuo Shinoda, Toyota, all of Japan

[73] Assignees: Nippondenso Co., Ltd., Kariya; Toyota Jidosha Kabushiki Kaisha, Toyota, both of Japan

[21] Appl. No.: 819,301

[22] Filed: Jan. 16, 1986

[30] Foreign Application Priority Data

Jan. 16, 1985 [JP] Japan ................................. 60-6334

[51] Int. Cl.⁴ .................. F02D 41/26; F02D 41/40; G05D 17/02; F02M 51/00
[52] U.S. Cl. ........................... 364/431.05; 123/480; 123/501; 364/431.03
[58] Field of Search ................. 364/431.05, 431.06, 364/431.04; 123/357, 480, 500, 501, 486

[56] References Cited

U.S. PATENT DOCUMENTS

| | | | |
|---|---|---|---|
| 4,348,728 | 9/1982 | Sagisaka et al. | 364/431.05 |
| 4,416,232 | 11/1983 | Shiozaki et al. | 123/357 |
| 4,423,485 | 12/1983 | Sami et al. | 123/357 |
| 4,438,496 | 3/1984 | Ohie | 364/431.05 |
| 4,503,830 | 3/1985 | Nakamura et al. | 123/501 |
| 4,594,979 | 6/1986 | Yasuhara | 123/357 |

FOREIGN PATENT DOCUMENTS

| | | | |
|---|---|---|---|
| 0179346 | 11/1982 | Japan | 123/501 |
| 58-20935 | 2/1983 | Japan . | |
| 58-70029 | 4/1983 | Japan . | |
| 59-153942 | 9/1984 | Japan . | |
| 59-160047 | 9/1984 | Japan . | |
| 0190475 | 10/1984 | Japan | 123/501 |

Primary Examiner—Felix D. Gruber
Attorney, Agent, or Firm—Cushman, Darby & Cushman

[57] ABSTRACT

An apparatus for controlling the timing of fuel injection into a diesel engine, including means for computing a target time at which injection should occur and means for sensing when injection actually occurs, with respect to a reference crankshaft position, feedback control means for adjusting the actual injection time to bring this into coincidence with the target injection time, means for sensing when firing of fuel within an engine cylinder actually occurs and for computing a target firing time based on the current operating status of the engine. A compensation factor is computed based on the difference between the actual and target firing times, and is utilized to modify the actual fuel injection time such as to bring the actual and target firing times into coincidence. Means are included for judging whether the engine operating status will permit reliable firing time data to be acquired, and for selectively enabling and inhibiting computation of successive new values of compensation factor based on this judgement.

5 Claims, 10 Drawing Sheets

FUEL INJECTION TIMING CONTROL APPARATUS FOR A DIESEL ENGINE, INCLUDING A DETERMINATION OF WHEN ACTUAL IGNITION CAN BE DETECTED

BACKGROUND OF THE INVENTION

The present invention relates to a fuel injection timing control apparatus for a diesel engine, whereby the timing of fuel injection into the cylinders of the engine is controlled on the basis of injection time phase difference deviations and firing time deviations.

There have been various proposals in the prior art for a fuel injection timing control apparatus having similar objectives to those of the present invention. For example Japanese patent No. 58-70029 describes an apparatus in which an actual firing time sensor is employed to detect the points in time at which firing (i.e. combustion of fuel being injected into a cylinder) actually occurs. This sensing is performed by detecting light which is emitted by the firing, e.g by an opto-electric sensing element disposed outside a viewing window. A target firing time is established, and feedback control is applied by a fuel injection timing control means such as to vary the timing of fuel injection into the cylinders until the actual firing time is made coincident with the target firing time. However, such an apparatus presents problems due to the fact that under some engine operating conditions, for example during intervals in which the engine is run without fuel being injected into the cylinders, or when the engine is idling with only very small amounts of fuel being injected into the cylinders, or when the viewing window is obscured by soot, etc, satisfactory signals will not be produced from the firing time sensor.

In order to overcome this problem, it has been proposed, for example in Japanese patent No. 59-153942, to switch over to an open-loop control of the fuel injection timing when satisfactory signals cannot be obtained from the sensor means used to detect the actual firing times. However such open-loop control cannot provide precise control of the fuel injection timing. Another attempt to overcome this problem is proposed in Japanese patent No. 58-20935, in which changeover to control of the fuel injection timing on the basis of a rotational phase difference is performed, when the firing time sensor means becomes inoperative as described above. However such control cannot provide a sufficiently high degree of accuracy, due to errors which arise from the mechanical tolerances of the fuel injection pump and engine components, inaccuracies resulting from component wear over a long period of use, etc.

It can thus be understood that prior art types of apparatus for controlling the fuel injection timing of a diesel engine based on firing times do not provide a highly accurate control over the entire range of engine operating conditions.

SUMMARY OF THE DISCLOSURE

With a fuel injection timing control apparatus for a diesel engine according to the present invention, control is basically performed on the basis of a phase difference between an actual fuel injection and a commanded fuel injection, which precisely expresses a timing at which fuel is injected into a cylinder of the engine. A feedback signal based on this phase difference is derived, and the feedback signal is then corrected by a correction factor, to provide compensation for the effects of mechanical tolerances of the fuel injection pump and the diesel engine and errors resulting from component wear over a long period of use, etc. This correction factor is periodically updated, i.e. a new value for the factor is computed, based on an engine firing signal consisting of pulses which are generated by detection of firing occurring within a cylinder of the diesel engine. It is a basic and novel feature of the present invention that this updating of the correction factor is performed only when it is judged that the diesel engine is running within a specific range of operating parameters, for example when the degree of accelerator pedal actuation is within a specific range while at the same time the engine speed of rotation is within a specific range. This range of operating conditions of the engine is determined such as to ensure the feasibility of obtaining a signal indicating the actual times of firing within a cylinder of the diesel engine in a stable and reliable manner, with this signal being employed in computing an updated value for the correction factor. So long as the engine continues to operate within the above range, then closed-loop control of the fuel injection time will be performed, with the correction factor being regularly updated in accordance with successively obtained firing time values. When it is judged that the engine has ceased to operate within that range, so that there is no longer any assurance of obtaining an accurate signal indicating the fuel firing times, then updating of the correction factor is terminated, with closed loop control of the fuel injection time being continued, employing the phase difference described above and utilizing the most recently updated value of the correction factor for correction purposes. When the engine subsequently again enters the range of operation within which correction factor updating is feasible, then this updating is resumed.

In this way, accurate closed-loop control of fuel injection timings is attained over the entire range of engine operating conditions.

More specifically, a fuel injection timing control apparatus for a diesel engine according to the present invention comprises operating status sensing means for sensing a current operating status of the engine and producing output data indicative thereof, reference position sensing means for detecting a reference time point at which a crankshaft of the engine attains a reference angular position and producing a corresponding output signal, phase difference sensing means for detecting a phase angle representing a time at which fuel is injected into a cylinder of the engine and for producing data indicative thereof, firing time sensing means for detecting firing of fuel within a cylinder of the engine and producing a signal indicative thereof, target firing time computation means for computing a target firing time at which the latter firing should occur with respect to the reference time point, based on output data from the operating status sensing means, actual firing time computation means for computing an actual firing time with respect to the reference time point, based on output data from the reference position sensing means and the firing time sensing means, compensation factor computation means for computing a correction factor based on a difference between output data from target firing time computation means and actual firing time computation means, injection time adjustment means controllable for varying the time of injection of fuel into the cylinders of the engine, output value computation means for computing an output data value, based on data produced from phase difference sensing means and operating status sensing means, with this output data value being applied to the injection time adjustment means and being such that the injection time adjustment means acts to bring the actual fuel injection time into coincidence with the target fuel injection time, the output value computation means also acting to modify the output data value computed thereby, in accordance with the correction factor, such as to modify the fuel injection time to bring the actual firing time into coincidence with the target firing time, and updating feasibility judgement means for performing computations, based on output data from the operating status sensing means, to judge whether a current operating status of the diesel engine is suitable for obtaining actual firing time data from the firing time sensing means, and for respectively enabling and inhibiting computation of a new value of the compensation factor, in accordance with the result of this judgement.

DESCRIPTION OF THE PREFERRED EMBODIMENTS

Figure 1:
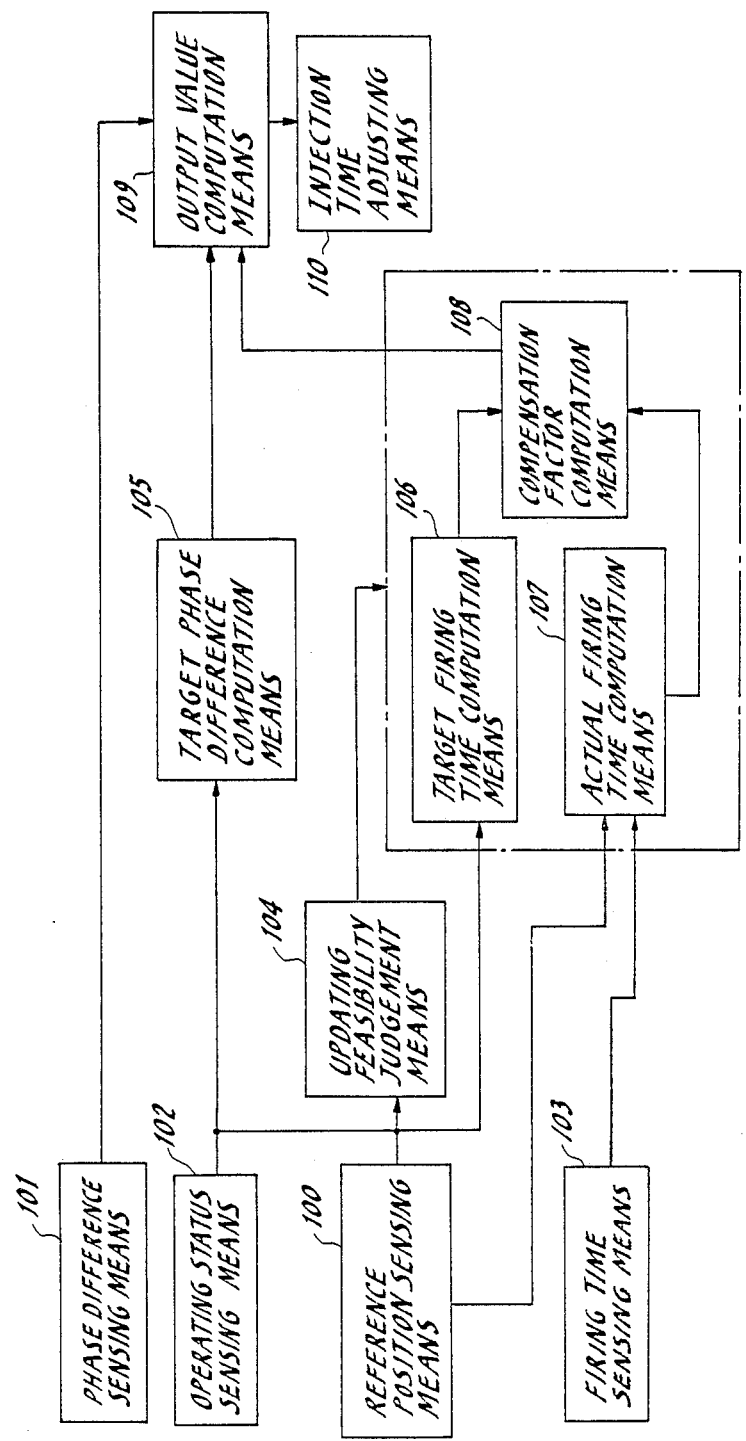
FIG. 1 is a general block diagram for illustrating the basic configuration of a fuel injection timing control apparatus according to the present invention.

FIG. 1 is a general block diagram for assistance in describing the basic features of the present invention. In FIG. 1, reference numeral 101 denotes actual phase difference sensing means for detecting a time difference which corresponds to an actual fuel injection timing of a fuel injection pump. Reference numeral 102 denotes operating condition sensing means for producing output signals that are input to target phase difference computation means 105. The target phase difference computation means 105 computes a target phase difference, corresponding to a target fuel injection time. Compensation amount computation means 108 serves to compute a correction factor, and tis factor, together with the value of target phase difference and actual phase difference is applied to output value computation means 109. The output value computation means 109 computes an output value which is applied to control injection timing adjustment means 110.

Reference numeral 104 denotes correction factor updating feasibility judgement means for performing computations to judge whether the current operating condition of the diesel engine is suitable for performing updating of the correction factor, with this updating computation being carried out on the basis of output signals which are produced from engine operating condition sensing means 102 and from firing time sensing means 103 and reference position sensing means 100. The output signals from the engine operating condition sensing means can represent for example the current speed of rotation of the engine and current amounts of fuel being injected in each fuel injection operation. More specifically, the correction factor updating judgement means judges whether the engine is functioning within a certain range of operating parameter values such that data representing the precise timings of fuel firing within the engine cylinders can be accurately obtained, since the updating of the correction factor is essentially based on this data. Such data can for example be obtained by signals produced from an opto-electric probe mounted to protrude within the combustion chamber of a cylinder. The target firing time computation means 106 computes target firing times for the engine, based on signals which are output from the operating condition sensing means 102. Actual firing time computation means 107 compute the actual times at which firing occurs in the cylinders, based on output signals from the firing time sensing means 103 and from reference position sensing means 100. The compensation factor computation means 108 produce output signals representing the correction factor described above, which are input to output value computation means 109, together with data from the phase difference sensing means 101 and the target phase difference computation means 105. Output data from the output value computation means 109 based on these inputs is applied to injection timing adjustment means 110, which acts to successively increase or decrease the timings at which fuel is injected into the cylinders until the actual firing times are brought into coincidence with the target firing times. When these times coincide, then the corresponding compensation factor is held fixed until another computation to obtain a new value of compensation factor is performed i.e. the data representing the most recently updated value of compensation factor is retained. The process of successively acquiring new values of compensation factor is periodically repeated until it is detected that the engine is no longer operating in a suitable condition for acquisition of data to be used in acquiring a new value of the compensation factor. When this occurs, the most recently obtained value of compensation factor is held fixed, until the engine again enters an operating condition which is suitable for acquisition of new values of compensation factor. However closed-loop control of the fuel injection timings, based on the latest value of the compensation factor and the fuel injection phase difference data continues to be performed, ensuring maximum accuracy of injection timing control even when the engine is operating under conditions in which updating of the correction factor is not possible.

Figure 2:
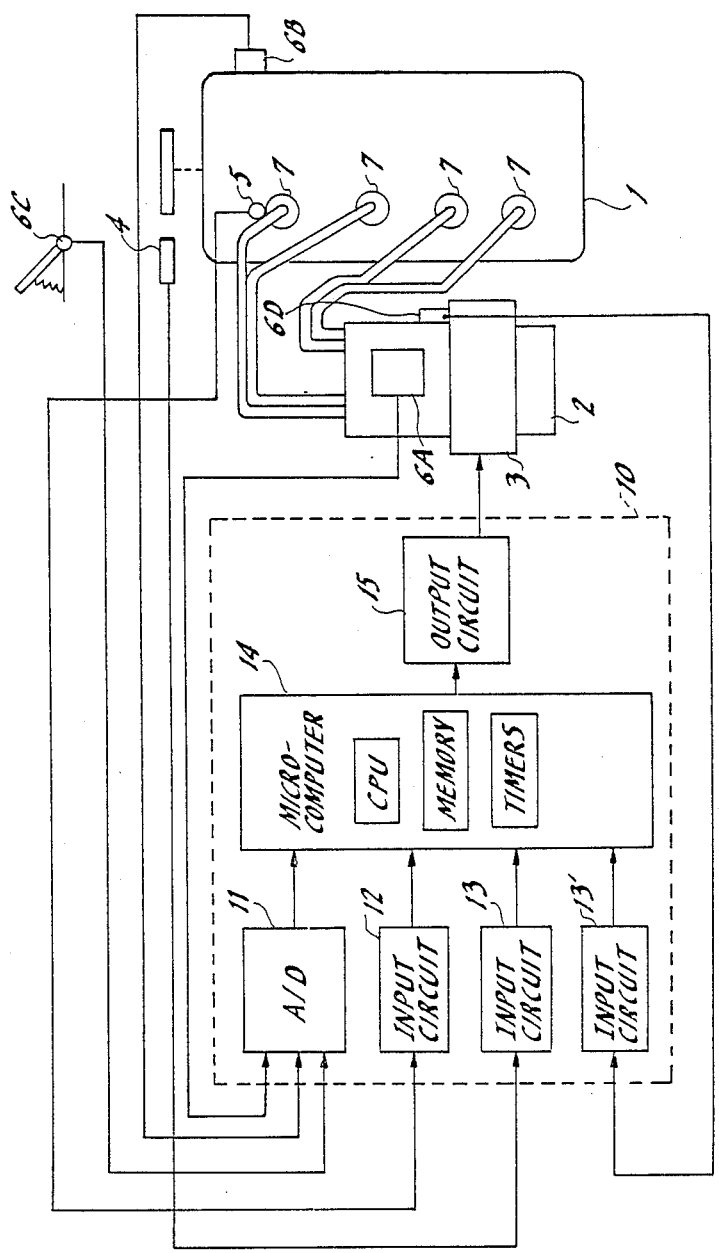
FIG. 2 is a block diagram showing an embodiment of the present invention.

An embodiment of the present invention will now be described, referring first to FIG. 2 and the waveform diagrams of FIGS. 9(a) to 9(d). In FIG. 2, reference numeral 1 denotes a diesel engine. A distributor type of fuel injection pump 2 injects fuel under high pressure through each of a set of fuel injection nozzles 7 into respective cylinders of diesel engine 1. The timings of fuel injection operations by pump 2 are controlled by an injection time adjustment unit 3, which in this embodiment consists of an electrohydraulic timer. A reference position sensor 4 serves to detect when the crankshaft of diesel engine 1 has reached a reference angular position, and is made up of a toothed wheel which is mounted coaxially with the crankshaft of diesel engine 1 and a fixed electromagnetic pick-up which is fixedly mounted opposite this toothed wheel. The reference position sensor 4 is utilized to measure the speed of rotation of diesel engine 1.

Figure 4:
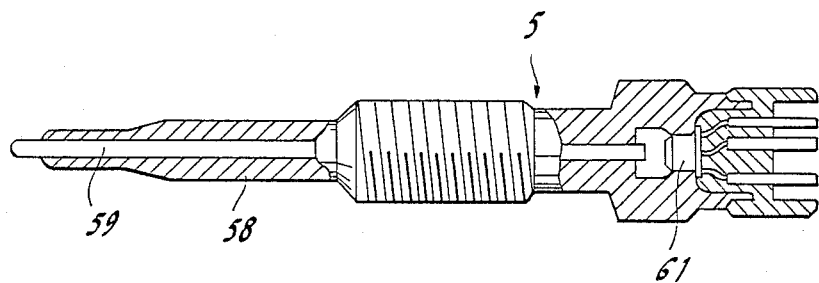
FIG. 4 is a cross-sectional view of a firing time sensor element.

Reference numeral 5 denotes a firing time sensor, for detecting the timings at which firing occurs within one of the cylinders of diesel engine 1. An example of a suitable configuration for the firing time sensor 5 is shown in FIG. 4. Here, numeral 58 denotes a housing which is of semi-hollow construction and is formed of a heat-resistant material. A rod-shaped member 59 is formed of a heat-resistant optically transparent material such as quartz glass, and is mounted within the hollow portion of housing 58, held fixedly retained therein by suitable attachment means. The transparent rod 59 is mounted such as to protrude outward from the tip of housing 58 by approximately 3 to 5 mm. A photoelectric sensing element such as a phototransistor 61 is mounted in housing 58 facing the opposite end of rod 59 to the outwardly protruding end of that rod and concentric with the axis of elongation of rod 59. Light which is generated by firing within a cylinder of diesel engine 1 is transmitted from the protruding end portion of rod 59, along rod 59 and hence directed onto phototransistor 61 to generate a sensing signal.

Figure 5:
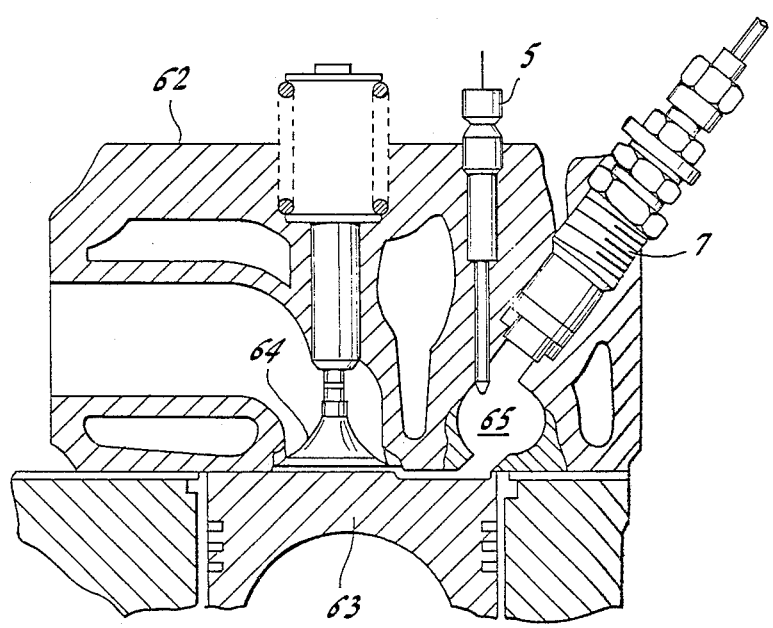
FIG. 5 is a cross-sectional view for illustrating the manner of mounting the sensor element of FIG. 4 in a diesel engine.

FIG. 5 is a partial cross-sectional view of diesel engine 1 illustrating the manner in which firing time sensor 5 is mounted. In this embodiment, the diesel engine is of turbulent flow type. Reference numeral 62 denotes a cylinder head, numeral 64 an exhaust valve, numeral 63 a piston, and numeral 65 a turbulence chamber into which fuel is injected through the fuel injection nozzle 7. The firing time sensor 5 is fixedly mounted in cylinder head 62 by being screwed into an aperture communicating from the interior of turbulence chamber 65 to the exterior of the engine. With this arrangement, while the engine is operating within a specific range of parameters as mentioned above, the light flash generated upon the occurrence of firing within turbulence chamber 65 will be of sufficient intensity to result in an output signal from phototransistor 61 which will be of suitable magnitude for indicating the precise timing at which the firing occurred.

It should be noted that the present invention is not limited to the use of photo-electric sensing means for detecting the firing timing. It is equally possible for example to use a device which senses changes in fuel pressure, ion flow, or other suitable parameter.

Referring again to FIG. 2, an injection quantity sensor 6A serves to detect an actual amount of fuel which is injected by fuel pump 2 in each fuel injection operation. With the present embodiment, the injection quantity sensor 6A acts to sense the position of a spill ring of the fuel pump, as described hereinafter.

A temperature sensor 6B serves to sense the operating temperature of diesel engine 1. An accelerator position sensor 6C senses the amount of actuation of an accelerator pedal.

A phase sensor 6D senses an actual phase difference, which is the difference in phase occurrence between the fuel injection timing (which is variable by means of injection time adjustment unit 3) and a time point represented by a reference position of the engine crankshaft, which is detected by the reference position sensor 4.

Reference numeral 10 denotes an electronic control unit, which includes an analog/digital converter 11, waveform shaping circuits 12 and 13, a microcomputer 14, and an output circuit 15. The microcomputer 14 is preferably capable of processing 8-bit or 12-bit data, and includes a CPU, memory, timers, etc. The electronic control unit 10 supplies output pulses to the injection time adjustment unit 3, through output circuit 15. The injection time adjustment unit 3 functions such as to control the timings of fuel injection operations in accordance with the duty ratio of the output pulses applied thereto from output circuit 15.

Figure 3:
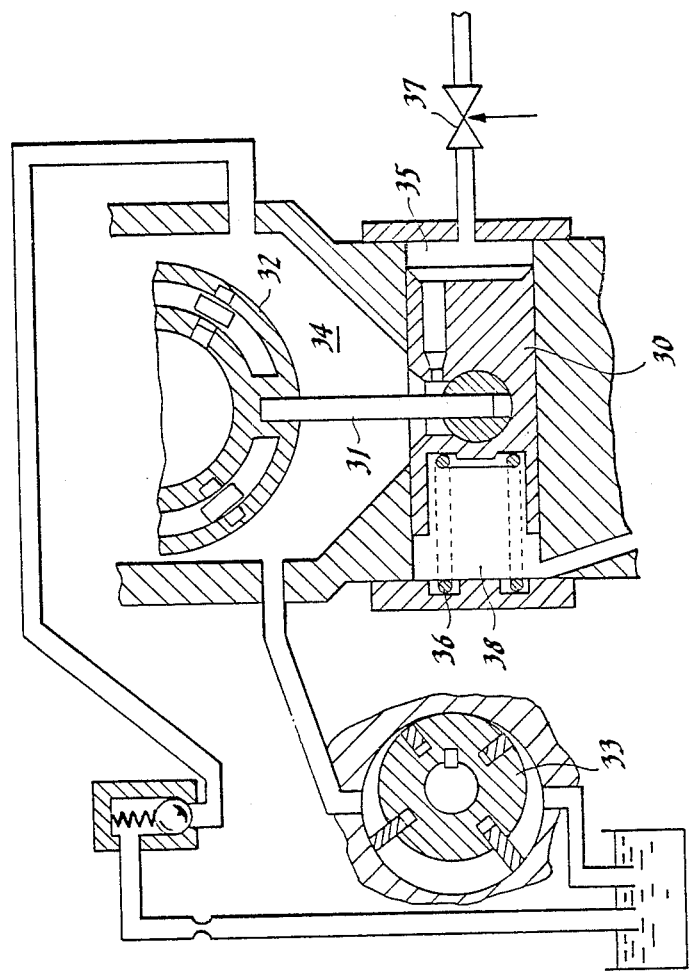
FIG. 3 is a cross-sectional view illustrating fuel injection timing adjustment means for the embodiment of FIG. 2.

FIG. 3 shows an example of a suitable configuration for the injection time adjustment unit 3. In FIG. 3, a timing piston 30 is coupled to a roller ring 32 by a pin 31. The angular position of the roller ring 32 determines the precise timings at which fuel is injected into each of the cylinders of diesel engine 1. As the timing piston 30 is moved to the left (as seen in FIG. 3), the roller ring 32 is rotated clockwise, and vice versa. In this way, the fuel injection timing (as represented by an amount of lateral displacement of the timing piston 30) is converted into an amount of angular displacement of the roller ring 32. This degree of angular displacement can be converted into an electrical signal by various means, which are well known i the art and will therefore not be described. The data represented by this electrical signal will be referred to as the fuel injection phase difference. Numeral 33 denotes a vane-type fuel pump which is rotated by a drive shaft (not shown in the drawings) to send fuel under pressure from a fuel tank to a pressure chamber 34 within the body of fuel injection pump 2. When fuel from pressure chamber 34 is injected into a cylinder of diesel engine 1, then during this injection process fuel is also passed through a narrow-bore restriction into a timer piston high-pressure chamber 35. Numeral 36 denotes a return spring, which is contained within a low-pressure chamber 38. The timing piston 30 becomes set at a position where there is a balance between the pressure force applied to the piston from high-pressure chamber 35 and the reaction force produced by return spring 36, and this position determines the injection timing, as well as the angular position of roller ring 32. Reference numeral 37 denotes an electromagnetic valve for pressure control, i.e. which controls the level of pressure within the high-pressure chamber 35. This is performed by valve 37 being periodically and alternately opened and closed, in response to a drive pulses applied thereto from output circuit 15 of electronic control unit 10 as describe above, with the duty ratio of successive opening and closing of valve 37 (i.e. the ratio of the duration of a time interval in which the valve is open to the duration of a succeeding time interval in which the valve is closed) being determined by the duty ratio of these drive pulses. In this way, the duty ratio of the output signal from electronic control unit 10 controls the position of the timing piston 30, and hence the timing of fuel injection by pump 2, while the timing which is actually set in this way is indicated by an amount of angular rotation of the roller ring 32. The phase difference between an electrical signal representing the angular position of the roller ring relative to a reference crankshaft position, produced by suitable transducer means as described above, will then represent the fuel injection timing, i.e. such transducer means in combination with the roller ring 32 constitute the fuel injection phase sensor 6D shown in FIG. 2.

Figure 6:
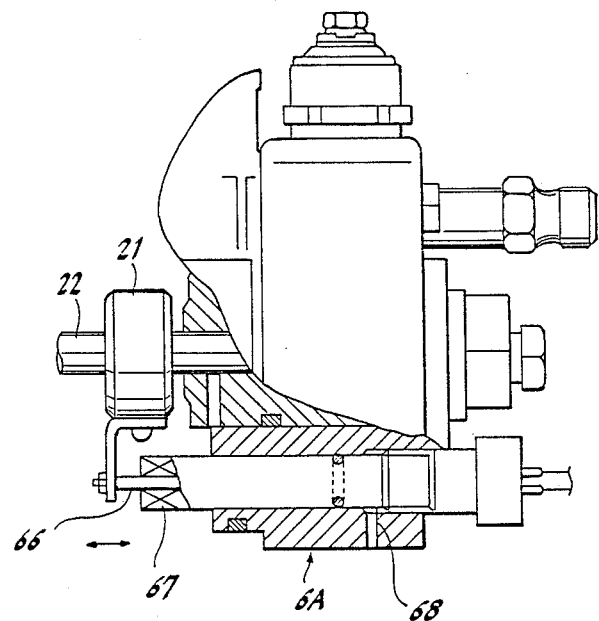
FIG. 6 is a partial cross-sectional view showing an actual injection quantity sensor.

Referring now to FIG. 6, an embodiment is shown of the actual injection quantity sensor 6A indicated in FIG. 2. Reference numeral 21 denotes an injection pump spill ring, and numeral 22 a plunger. The plunger is rotated, and also laterally displaced to the right or left (as seen in FIG. 6), by a face cam (not shown in the drawings), to thereby distribute fuel under pressure to the cylinders of diesel engine 1, with the amount of lateral displacement of the plunger 22 determining the amount of fuel delivered in each injection operation. The actual injection quantity sensor 6A includes a movable core 66, which is fixedly attached by a lever to the spill ring 21. A pair of coils 67 are wound around the periphery of a tubular bobbin having a hollow central region within which the movable core 66 moves. The body of the actual injection quantity sensor 6A is fixedly attached to the pump head by means of attachment screw 68. The coils 67 are respectively disposed such that the degree of mutual inductive coupling between them is varied in accordance with an amount of lateral displacement of the movable core 66. When the amount of fuel injected into the cylinders in each fuel injection operation is to be reduced, then the spill ring 21 and movable core 66 are moved to the left (as seen in FIG. 6), while when the amount of fuel injected is to be increased then spill ring 21 and core 66 are moved to the right. A periodically varying input signal of suitable waveform is applied to one of the coils 67 of actual injection quantity sensor 6A from a signal source (not shown in the drawings), whereby an output signal is produced from the other one of coils 67 whose amplitude is determined by the amount of mutual coupling between the coils, and hence by the amount of displacement of the spill ring 21. Thus, if a large quantity of fuel is injected into the cylinders in each injection operation, then the mutual coupling will be low, due to the rightward positioning of movable core 66, and hence the output signal level will be low, for example 1 V. When the engine is operating with low amounts of fuel being injected, during idling for example, then the spill ring 21 and hence core 66 will be positioned at the left, resulting in a high level of output voltage from actual injection quantity sensor 6A, for example 3V.

In the electronic control unit 10, a converter 11 converts the output signal thus generated by the actual injection quantity sensor 6A into a digital signal consisting of pulses whose pulse width is determined in accordance with the amplitude of the analog signal from the actual injection quantity sensor 6A. This pulse width therefore represents the actual fuel injection amount which is input in each injection operation (referred to in the following simply as the actual injection amount). Converter 11 also converts the analog output signals from the cooling water temperature sensor 4 and the accelerator pedal sensor 6C into digital signals having an appropriate number of bits.

Figure 7:
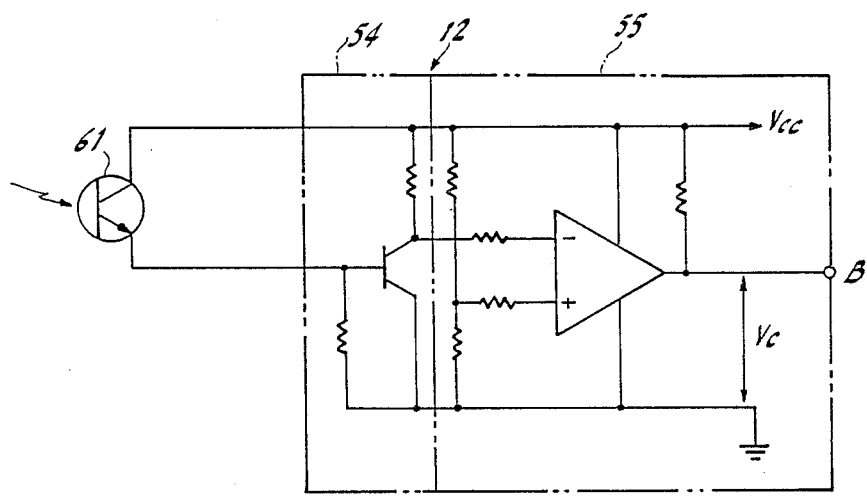
FIG. 7 is a circuit diagram of an input circuit for use with the sensor element of FIG. 4.

The configuration of input circuit 12 of electronic control unit 10 is shown in FIG. 7. This circuit produces an output signal voltage whose level increases in accordance with the intensity of input light applied to phototransistor 61 of the firing time sensor 5, described hereinabove. This output voltage is amplified by amplifier circuit 54, and then applied to a waveform shaping circuit 55, to produce an output signal $V_c$ having the waveform shown in FIG. 9(c).

Figure 8:
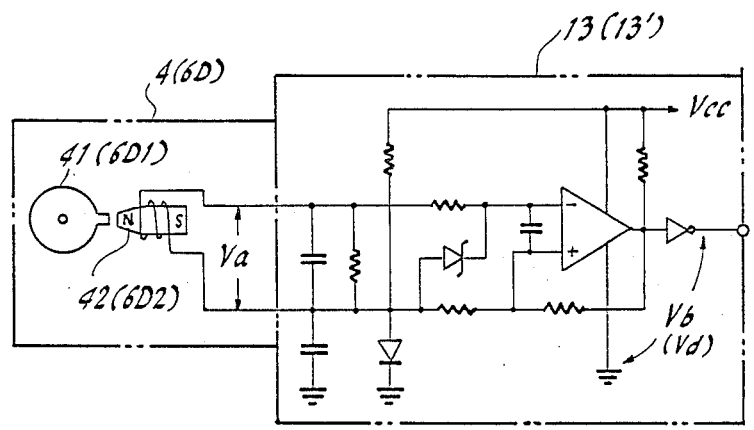
FIG. 8 is a circuit diagram of a configuration for a reference position sensor and for a fuel injection phase difference sensor together with an input circuit.

FIG. 8 shows an example of a suitable configuration for each of the reference position sensor 4 and the injection phase sensor 6D, and for input circuits 13 and 13'. Reference numeral 41 denotes a toothed wheel forming part of the reference position sensor 4, which rotates in synchronism with the crankshaft of diesel engine 1. An electromagnetic pick-up 42 is positioned opposite to toothed wheel 41, for producing an AC signal having the waveform shown in FIG. 9(a). Each point in time at which a zero crossing of this signal occurs corresponds to the attainment of a reference angular position by the crankshaft of diesel engine 1, with this position being disposed immediately following a top dead center position. This AC signal is applied to input circuit 13, which performs waveshaping to produce an output signal having the waveform shown in FIG. 9(b), with period $T_N$. This signal is input to microcomputer 14, which counts the pulse periods $T_N$ to thereby compute the speed of rotation of diesel engine 1.

The sensor signal from firing time sensor 5 is transferred through input circuit 12 to be input to microcomputer 14, which counts the number of occurrences of the time interval $T_{TP}$ between the output pulses from firing time sensor 5 and the output pulses from reference position sensor 4. Based on this count value and the speed of rotation of diesel engine 1, the angle of crankshaft advance, representing the advance of the angle of actual fuel firing as compared with reference angle of fuel firing is computed by microcomputer 14. Therefore the actual time of ignition of the fuel, relative to the reference crankshaft position, is derived.

Figure 18:
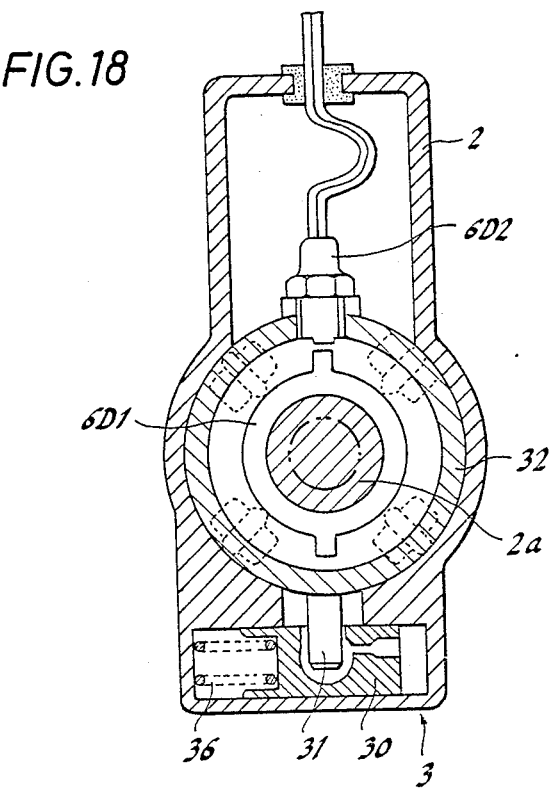
FIG. 18 is a cross-sectional view illustrating the physical configuration of a fuel injection phase sensor.

As indicated in FIG. 8, the phase sensor 6D and input circuit 13' can be of identical configuration to that shown in FIG. 8. However, as shown in the cross-sectional view of FIG. 18 which shows the physical arrangement of phase sensor 6D, the toothed wheel 6D1 of phase sensor 6D is fixedly mounted on the drive shaft 2a of the fuel injection pump 2, while the electromagnetic pick-up 6D2 of phase sensor 6D is attached to the roller ring 32. Thus, when the fuel injection timing is altered, the electromagnetic pick-up 6D2 will be rotated together with roller ring 32, about the axis of rotation of the pump drive shaft. In this way, he phase of the signal generated by pick-up 6D2 is correspondingly shifted. The resultant output signal from pick-up 6D2 is designated as $V_d$ and has the waveform shown in FIG. 9(d). The phase difference $T_P$ and the sensor signal from the reference position sensor 4 is indicative of the amount of difference between actual injection and the reference injection, and is used to derive the actual injection phase difference.

Figure 9:
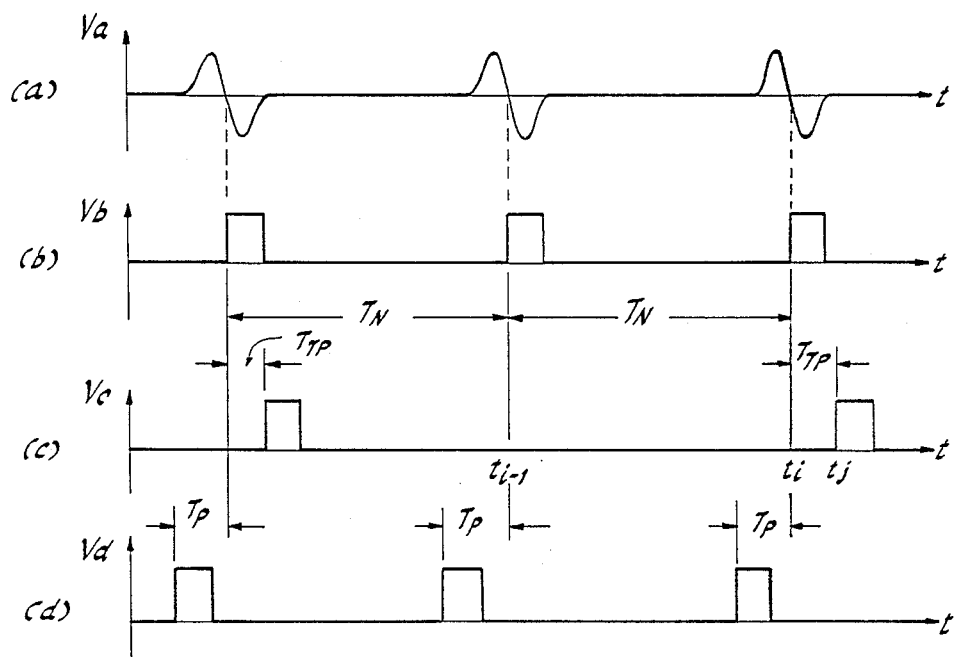
FIGS. 9(a) to 9(d) are waveform diagrams of signals produced by the circuits of FIG. 7 and FIG. 8.
Figure 10:
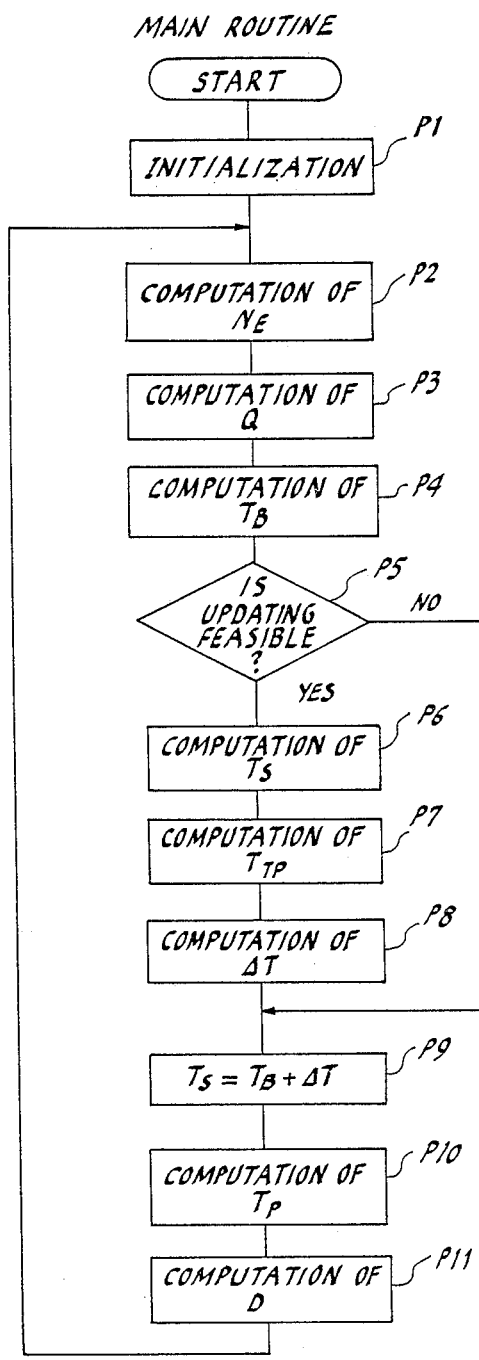
FIG. 10 to FIG. 16 are flow charts for illustrating the program flow sequence of control operation by a microcomputer in the embodiment of FIG. 2.
Figure 11:
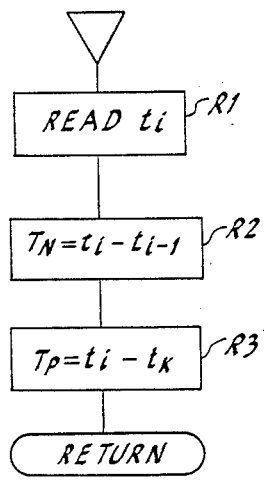

FIG. 10 to FIG. 16 are flow diagrams illustrating the flow of processing executed by microcomputer 14. FIG. 10 shows the main processing routine, FIGS. 11 to 16 show various interrupt routines. In FIG. 10, P1 denotes an initialization processing step which must be performed immediately after power is switched on. This includes, for example, clearing of a quantity representing the correction factor, designated in the following as the quantity $\Delta T$ and computed as described hereinafter. Next, in step P2, the period $T_N$ of output pulses from position sensor 4 is inverted and multiplied by a constant, to obtain the engine speed of rotation $N_E$. A reference position interrupt routine is then executed to determine the value of the pulse period $T_N$, at the timing of a rising edge of an output pulse from reference position sensor 4 (shown in FIG. 9(b)). The processing flow of this interrupt routine is shown in FIG. 11. First, in step R1, a timer value $t_i$ is read in, on a rising edge of a pulse of the reference position sensing signal $V_b$ shown in FIG. 9(b). The difference between this timer value $t_i$ and the value $t_{i-1}$ of the preceding cycle is then computed in step R2, to obtain the new period $T_N$ ($=t_i-t_{i-1}$). The actual phase difference $T_P(=t_i-t_k)$, i.e. the actual injection phase difference with respect to the reference crankshaft position, is then obtained in step R3.

Figure 12:
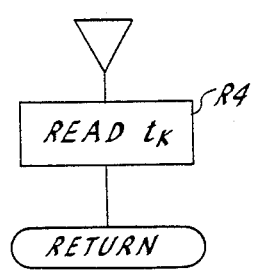

The timer value $t_k$ is obtained as follows. At the timing of a rising edge of a pulse of the phase signal $V_d$ produced from phase sensor 6D, shown in FIG. 9(d), the phase signal interrupt routine shown in FIG. 12 is activated. During the first step R4 of this routine, a timer value $t_k$ is computed, which is used in the computation step R3 mentioned above.

Figure 14:
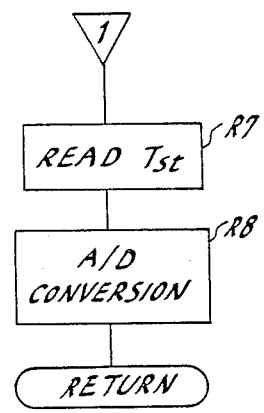
Figure 15:
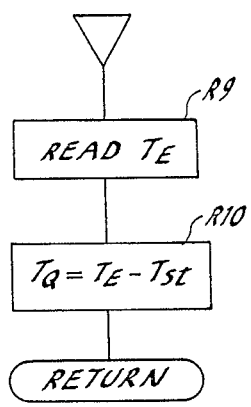

Referring again to FIG. 10, following step P2, upon return to the main routine, the actual injection quantity Q is computed in a processing step P3. In this step, a program interrupt is executed, at the point in time when A/D conversion operation, performed during a periodic interrupt subroutine 1 shown in FIG. 14 has been completed. In this program interrupt routine, the actual injection quantity A is obtained from the time difference $T_Q$ that is derived during the program interrupt routine shown in FIG. 15. The fixed time interrupt routine shown in FIG. 14 is activated and executed at regular fixed intervals, with a timer value $T_{ST}$ being read in as the first step 37 of the routine. A/D conversion by A/D converter 11 is then initiated (step R8). On completion of this A/D conversion, while the program is returning to the main routine, a jump is performed to the program interrupt routine shown in FIG. 15. In the first step R9 of this interrupt routine, the timer value $T_E$ corresponding to the point of completion of the A/D conversion is read. The time interval $T_{ST}$ is subtracted from the time interval $T_E$, to obtain the time interval $T_Q$ (step R10). $T_Q$ expresses the value of the output pulse width from A/D converter 11, and hence varies in accordance with the actual injection quantity Q, i.e. the actual amount of fuel which is currently being input to each cylinder in a fuel injection operation.

Referring again to FIG. 10, in the next processing step P3, the actual injection quantity Q is computed from the value $T_Q$.

In the next processing step P4, a target value of fuel injection phase difference $T_B$ is computed from the speed of rotation $N_E$ and the actual injection quantity Q.

Figure 17:
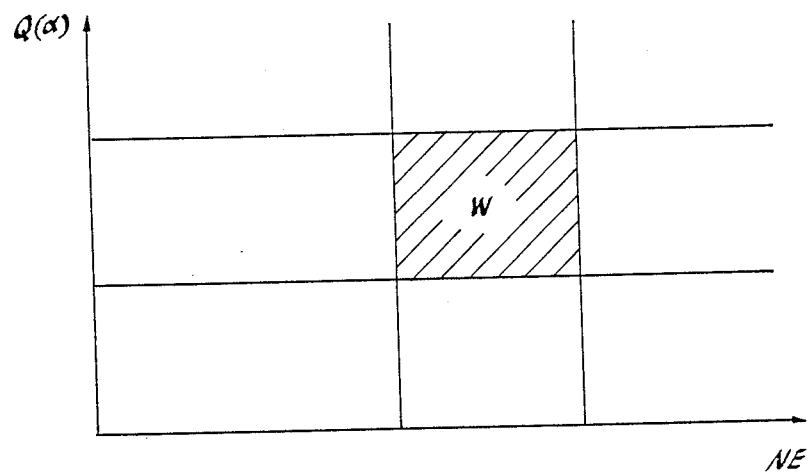
FIG. 17 is a diagram for graphically illustrating a range of engine operating conditions within which correction factor updating is judged to be feasible.

In step P5, a judgement is made as to whether or not the current operating condition of the engine is such that an updated value for the compensation amount $\Delta T$ can be computed. More specifically, a judgement is made as to whether the disel engine is currently running in an operating condition which will enable accurate and stable firing time data to be obtained from the output signal of the firing time sensor 5. In the present embodiment, this judgement determines whether or not the engine operating condition currently corresponds to a position within the region W shown in FIG. 17, i.e. whether the fuel injection quantity Q is within a predetermined range while at the same time the engine speed of rotation $N_E$ is within a predetermined range. In the example of FIG. 17 the region W corresponds to engine operation at medium values of engine speed and engine load. If it is judged that the engine operating conditions are suitable for updating the compensation quantity $\Delta T$, then processing proceeds to step P6. In this step, the value of $T_{TS}$ is obtained, in the same way as the value of $T_B$ in step P4, by mapping or by computation.

Figure 13:
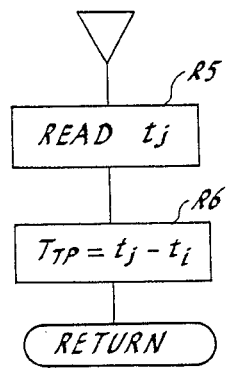

Next, in step P7, the actual firing time $T_{TP}$ (shown in FIG. 9(c)) is computed. When the rising edge of a pulse of the signal from the firing time sensor 5 occurs, an actual timing signal interrupt routine, shown in FIG. 13, is activated. In step R5 of this routine the timing of a rising edge of the output signal from sensor 5 is read, as time $t_j$. The difference $T_{TP}$ between this value $t_j$ and the previously read in value $t_i$ is then computed in step R6. In the succeeding step P8, the compensation quantity $\Delta T$ is either increased or decreased, in accordance with the difference between the target firing time value $T_{TS}$ and the actual firing time value $T_{TP}$, such as to bring $T_{TS}$ and $T_{TP}$ towards coincidence. Processing then advances to step P9.

If on the other hand it is judged during step P5 that the current engine operating condition is not suitable for acquiring data to compute a new value of the correction factor $\Delta T$, then the value of $\Delta T$ is held unchanged from the previous processing cycle, and a jump is performed to step P9.

In step P9, the basic target phase difference $T_B$ is added to the correction factor $\Delta T$, to thereby obtain a post-compensation target phase difference $T_S$, i.e. $T_S = T_B + \Delta T$. Next, in step P10, the actual phase difference $T_P$ is computed. However it should be noted that it would be equally possible to utilize the value of $T_B$ which is derived as described above in step P4.

Figure 16:
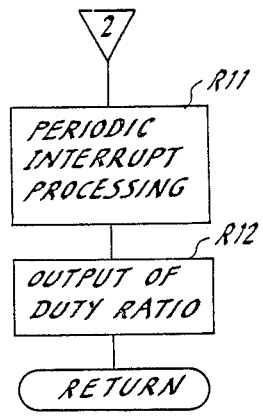

Next, in step P11, the periodic interrupt routine 2 shown in FIG. 16 is executed, whereby the value D of duty ratio of the drive pulses to be applied to electromagnetic valve 37 (shown in FIG. 3) is computed. This is computed on the basis of the deviation between the target phase difference Ts and the actual phase difference $T_p$, such as to bring this deviation to zero. That is to say, the duty ratio of the drive pulses is adjusted such that the pressure within chamber (in FIG. 3) causes timing piston 30, and hence roller ring 32, to be set to a position whereby the fuel injection phase difference deviation is reduced to zero.

Processing then returns to step P2, and the sequence of processing steps described above is repeated, to obtain another value of the output duty ratio D. In this way, each time a program loop is completed, the periodic interrupt routine shown in FIG. 16 is executed, consisting of a periodic interrupt processing step R11 followed by computation of a new value of duty ratio D in step R12. This computation of a value for duty ratio D is performed in synchronism with output of a pulse from output circuit 15, and is used to determine the pulse width.

In the description of the flow charts given above, the actual injection quantity Q is employed as a parameter for computing the basic target phase difference $T_B$ and the target firing time $T_{TS}$ and in judging whether the engine operation condition is suitable for acquiring data representing engine operating parameters, for use in computing a new value of correction factor ΔT. However it should be noted that it would be equally possible to utilize some other quantity for this purpose. Specifically, it would be possible to directly replace the actual injection quantity Q in the above description by a value representing the position of the accelerator pedal (indicated as α in FIG. 17).

Furthermore in the above, the present invention is described as being applied to a distributor type of fuel injection pump. However the invention is equally applicable to a diesel engine system employing a fuel injection pump of the type whereby a phase difference between the pump driveshaft position and the engine crankshaft position is converted into a fuel injection timing value.

Figure 19:
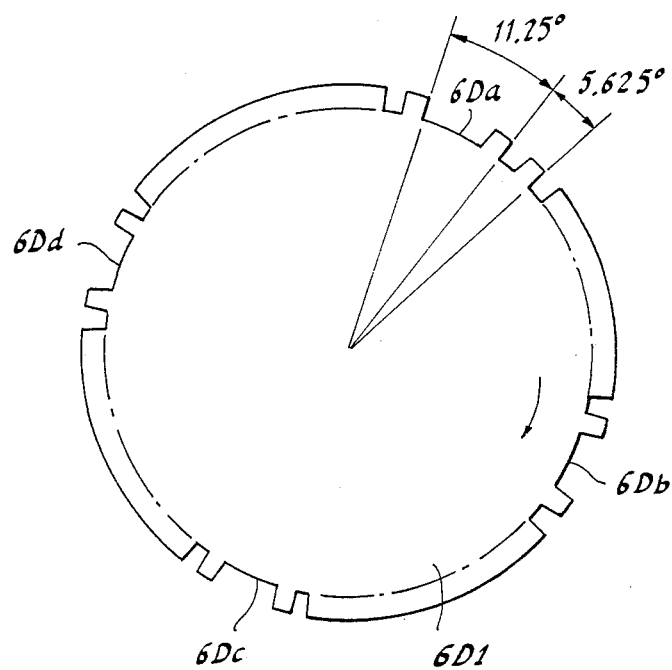
FIG. 19 shows an alternative example of a toothed wheel for a phase sensor of the form shown in FIG. 18.
Figure 20:
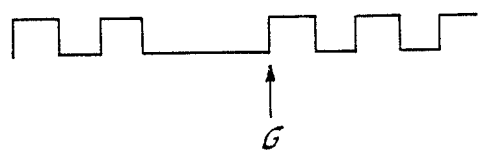
FIG. 20 is a waveform diagram for illustrating output signal pulses produced by a phase sensor employing the toothed wheel shown in FIG. 19.

In addition, with the above embodiment the toothed wheel 6D1 of phase sensor 6D is formed with tooth protrusions which result in the generation of two signal pulses for each revolution of the fuel pump driveshaft (i.e. two pulse for every two revolutions of the engine crankshaft). This matches the number of teeth of the crankshaft reference position sensor 4. However if fuel injection quantity control is to be performed in addition to injection timing control, then since only one signal pulse is produced for each revolution of the engine crankshaft with the described embodiment it would be difficult to derive sufficiently detailed engine speed data if these signal pulses are to be employed as engine speed data for fuel injection quantity control. If injection quantity control is also to be implemented, therefore, the toothed wheel embodiment shown in FIG. 19 is preferable for use as the toothed wheel of the phase sensor 6D, which detects the phase difference between the fuel injection timings and a reference engine crankshaft position as described hereinabove. The number of teeth disposed around the periphery of the toothed wheel in the example of FIG. 19 is increased to 64. It is assumed that the engines has 4 cylinders, and there are provided four positions around the periphery of toothed wheel 6D1 at which a tooth gap occurs, designated as 6Da to 6Dd respectively, with each tooth gap corresponding to the position for fuel injection into a specific cylinder The sensor signal waveform which will be obtained from the phase sensor 6D in this case will be as shown in FIG. 20. This signal is input to microcomputer 14, which measures the time from the rising edge of each pulse of the signal until the rising edge of the succeeding pulse, and in this way detects the timings corresponding to the tooth gaps 6Da to 6Dd, to thereby define time points as designated by G in FIG. 20. Such a time point G can be utilized to derive the fuel injection phase difference, which is thereafter employed for control of fuel injection timing in the same way as the injection phase difference derived by the previous embodiment, and in addition can be employed for fuel injection quantity control. In this case, even if the rate of input of engine speed data is high, stable and accurate fuel quantity control can be attained.

With the present invention, fuel injection timing control of a diesel engine is performed essentially by feedback employing time data derived from fuel injection timing phase difference data, i.e. phase difference with respect to a reference engine crankshaft position, with this data being corrected by a correction factor which is computed based on actual firing times occurring within a cylinder of the diesel engine. This enables feedback signals to be derived over the entire operating range of the engine, and provides stable control to be attained. Furthermore the effects of deviations of the fuel injection timings from a target value, resulting from mechanical tolerances in the pump structure, engine mechanical tolerances, and errors resulting from wear as the engine operating life increases, are eliminated. In addition, closed-loop injection timing control is maintained over the entire engine operating range, by ensuring that acquisition and application of fuel injection timing phase difference correction data is only performed when it is known that this correction data can be acquired in an accurate and stable manner, i.e. only while the engine is running within a specific range of operating conditions. When it is judged that the engine is operating outside the latter range, closed-loop control is continued, employing the most recently computed value of correction factor. In this way, precise and stable control of the fuel injection timing is ensured.

Although the present invention has been described in the above with reference to specific embodiments, it should be noted that various changes and modifications to the embodiments may be envisaged, which fall within the scope claimed for the invention as set out in the appended claims. The above specification should therefore be interpreted in a descriptive and not in a limiting sense.

What is claimed is:

1. A fuel injection timing control apparatus for a diesel engine equipped with a fuel injection pump, comprising:
   input means for receiving information indicative of a current operating status of said engine, and producing output data indicative thereof;
   reference detecting means for detecting a reference time point at which a crankshaft of said engine attains a reference angular position and producing a corresponding time reference signal indicative thereof;
   means for detecting an actual fuel injection time point as a specific positional relationship between predetermined components of said fuel injection pump;
   firing time sensing means for detecting an actual firing of fuel within a cylinder of said engine, and producing a signal indicative thereof;
   processing means for:
   (a) computing a target firing time at which said firing should occur with respect to said reference time point based on output data from said operating status sensing means, and for producing data indicative of said target firing time point;
   (b) computing, based on said output data from said input means, a target fuel injection time difference between said reference time point and a target fuel injection time point, and for producing data indicative of said target fuel injection time point, and for producing data indicative of said target fuel injection time difference;
   (c) detecting an actual fuel injection time difference between said reference time point and said actual fuel injection time point and producing data indicative of said actual fuel injection time difference;
   (d) computing an actual firing time point from a reference of said reference time point, based on said signals from said reference position sensing means and said firing time sensing means, and for producing data indicative of said actual firing time point;
   (e) performing computations, based on output data from said input means, to determine whether or not a current operating status of said diesel engine enables a stable detecting operation by said firing time sensing means and producing an indication indicative of said determining;

(f) periodically computing, responsive to said indication from said step (e) that said engine operating status enables stable firing time detection, computing a value of a correction factor based on a difference between said target firing time point and said actual firing time point, storing said computed correction factor, and producing an output correction factor from said computed value while said indication is present, and for terminating said computation and updating operations and producing said stored value of correction factor as said output correction factor when said indication indicates that stable firing time detection cannot be obtained; and (g) computing an output data value, based on said actual fuel injection time difference and said target fuel injection time difference, and for applying said output data value as a control value to control said injection time adjustment means such as to bring said actual fuel injection time difference into coincidence with said target fuel injection time difference, and for modifying said output data value in accordance with said output correction factor, such as to modify said actual fuel injection time difference to bring said actual firing time into coincidence with said target firing time; and injection time adjustment means, responsive to a control value, for controlling said fuel injection pump to vary said actual fuel injection time difference.

2. A fuel injection timing control apparatus according to claim 1 in which said processing means is a programmed microcomputer.

3. A fuel injection timing control apparatus according to claim 1, in which said firing time sensing means comprises an opto-electric sensor for detecting a flash of light produced upon firing within a cylinder of said engine.

4. A fuel injection timing control apparatus according to claim 3, in which said opto-electric sensor comprises an optically transparent rod formed of heat-resistant material, mounted to protrude from the exterior of said engine into a combustion chamber thereof, and a photosensing element disposed to generate an electrical signal in response to light transmitted along said transparent rod to the exterior of said engine.

5. An apparatus of claim 1, wherein said predetermined components of said fuel injection pump include a drive shaft and a spill ring of said pump.

* * * * *